US009313117B2

(12) United States Patent
Chunduri et al.

(10) Patent No.: US 9,313,117 B2
(45) Date of Patent: Apr. 12, 2016

(54) ALTERNATE METHOD TO GIVE OPERATORS FLEXIBILITY TO CHOOSE LFAS

(71) Applicant: Telefonaktiebolaget L M Ericsson (publ), Stockholm (SE)

(72) Inventors: Uma S. Chunduri, Fremont, CA (US); Wenhu Lu, San Jose, CA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 57 days.

(21) Appl. No.: 14/288,338

(22) Filed: May 27, 2014

(65) Prior Publication Data

US 2015/0350061 A1 Dec. 3, 2015

(51) Int. Cl.
*H04L 12/751* (2013.01)
*H04L 12/707* (2013.01)
*H04L 12/705* (2013.01)
*H04L 12/24* (2006.01)
*H04L 12/717* (2013.01)

(52) U.S. Cl.
CPC ............ *H04L 45/02* (2013.01); *H04L 41/0654* (2013.01); *H04L 45/18* (2013.01); *H04L 45/22* (2013.01); *H04L 45/42* (2013.01)

(58) Field of Classification Search
None
See application file for complete search history.

(56) References Cited

U.S. PATENT DOCUMENTS

| | | | | |
|---|---|---|---|---|
| 2004/0039839 A1* | 2/2004 | Kalyanaraman | ........ | H04L 45/34 709/238 |
| 2005/0041636 A1* | 2/2005 | Iselt | ........................ | H04L 45/00 370/351 |
| 2005/0073958 A1* | 4/2005 | Atlas | ........................ | H04L 45/00 370/238 |
| 2005/0220077 A1* | 10/2005 | Vereecke | ............ | H04L 12/4641 370/351 |
| 2006/0007863 A1* | 1/2006 | Naghian | ............... | H04L 45/121 370/238 |

(Continued)

OTHER PUBLICATIONS

"Transmission Control Protocol, DARPA Internet Program Protocol Specification," Sep. 1981, 91 pages, Network Working Group, Request for Comments: 793.
Socolofsky, et al., "A TCP/IP Tutorial," Jan. 1991, 28 pages, Network Working Group, Request for Comments: 1180.

(Continued)

*Primary Examiner* — Jenee Williams
(74) *Attorney, Agent, or Firm* — Nicholson, De Vos, Webster & Elliot, LLP

(57) ABSTRACT

The method and system to computes an LFA next hop as a backup for a primary path next hop that enables an administrator to control LFA selection for a given destination node using a tag and a weight. The method includes checking whether an interface of a next candidate node has a tag with a tag value matching a tag value of a primary SPF path for the destination node. The method further includes checking whether the destination node has any LFA, checking whether a stored tag differs from the tag value of the primary SPF path, and checking whether the interface of the next candidate node is preferred based on a comparison of a weight values, and replacing a stored LFA for the destination node with the next candidate node. Where conditions are met a stored LFA is replaced with the next candidate node.

20 Claims, 8 Drawing Sheets

(56) References Cited

U.S. PATENT DOCUMENTS

| | | | | |
|---|---|---|---|---|
| 2007/0242607 | A1* | 10/2007 | Sadler | H04L 41/12 370/238 |
| 2008/0056137 | A1* | 3/2008 | Ravindran | H04L 45/00 370/238 |
| 2008/0062916 | A1* | 3/2008 | Mosko | H04L 45/18 370/328 |
| 2010/0161727 | A1* | 6/2010 | Shaffer | G06Q 10/10 709/204 |
| 2010/0284309 | A1* | 11/2010 | Allan | H04L 45/00 370/256 |
| 2011/0090787 | A1* | 4/2011 | Smith | H04L 41/0659 370/225 |
| 2011/0116366 | A1* | 5/2011 | Smith | H04L 45/48 370/225 |

OTHER PUBLICATIONS

Ali, Z., et al., ""Node-ID Based Resource Reservation Protocol (RSVP) Hello: A Clarification Statement,"", *Network Working Group, Request for Comments: 4558, Category: Standards Track*, Jun. 2006, 8 pages.

Andersson, L., et al., "LDP Specification", *Network Working Group, Request for Comments: 5036*, (Oct. 2007), 136 pages.

Awduche, D., et al., "RSVP-TE: Extensions to RSVP for LSP Tunnels", *Network Working Group, Request for Comments: 3209, The Internet Society*, http://tools.ietf.org/html/rfc3209, (Dec. 2001), 62 pages.

Babiarz, J., et al., "Configuration Guidelines for DiffServ Service Classes", *Network Working Group, Request for Comments: 4594, The Internet Society*, (Aug. 2006), 57 pages.

Baker, F., "A Differentiated Services Code Point (DSCP) for Capacity-Admitted Traffic", *Internet Engineering Task Force (IETF), Request for Comments: 5865, IETF Trust*, (May 2010), 14 pages.

Baker, F., et al., "Management Information Base for the Differentiated Services Architecture", *Network Working Group, Request for Comments: 3289, The Internet Society*, (May 2002), 116 pages.

Berger, L., "Generalized Multi-Protocol Label Switching (GMPLS) Signaling Resource ReserVation Protocol-Traffic Engineering (RSVP-TE)", *Network Working Group; RFC 3473*; Jan. 2003; 42 pages.

Bernet, Y., et al., "An Informal Management Model for Diffserv Routers", *Network Working Group, Request for Comments: 3290, The Internet Society*, (May 2002), 56 pages.

Black, D., "Differentiated Services and Tunnels", *Network Working Group, Request for Comments: 2983, The Internet Society*, (Oct. 2000), 14 pages.

Black, D., et al., "Per Hop Behavior Identification Codes", *Network Working Group*, Jun. 2001, *Standards Track, RFC 3140*, pp. 1-8.

Blake, S., et al., "*An Architecture for Differentiated Services*," Dec. 1998, 36 pages, *Network Working Group, Request for Comments: 2475, The Internet Society*.

Borman, D., et al., "IPv6 Jumbograms", *Network Working Group, Request for Comments: 2675, The Internet Society*, (Aug. 1999), 9 pages.

Braden, R., et al., "Resource ReSerVation Protocol (RSVP) Version 1 Functional Specification", *Network Working Group, Request for Comment: 2205*, Sep. 1997, 112 pages.

Chan, K., et al., "Differentiated Services Quality of Service Policy Information Base", *Network Working Group, Request for Comments: 3317, The Internet Society*, (Mar. 2003), 96 pages.

Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.

Coltun, R., et al., "OSPF for IPv6", *Network Working Group, Request for Comments: 5340*, Jul. 2008, 95 pages.

Davie, B., et al., "An Expedited Forwarding PHB (Per-Hop Behavior)", *Network Working Group, Request for Comments: 3246, The Internet Society*, (Mar. 2002), 16 pages.

Deering, et al., "Internet Protocol", *IETF RFC 2460, version 6 (IPv6) Specification*, Dec. 1998, 37 pages, http://www.ietf.org/rfc/rfc2460.txt.

Eggert, L., et al., "Unicast UDP Usage Guidelines for Application Designers", *Network Working Group, Request for Comments: 5405, IETF Trust*, (Nov. 2008), 27 pages.

Fenner, B., et al., "Management Information Base for the User Datagram Protocol (UDP)", *Network Working Group, Request for Comments: 4113, The Internet Society*, (Jun. 2005), 19 pages.

Grossman, D., "New Terminology and Clarifications for Diffserv", *Network Working Group, Request for Comments: 3260, The Internet Society*, (Apr. 2002), 10 pages.

Hedrick, C., "Routing Information Protocol", *Network Working Group, Request for Comments: 1058*, (Jun. 1988), 34 pages.

Heinanen, J., et al., "Assured Forwarding PHB Group", Jun. 1999, 11 pages, *Network Working Group, Request for Comments: 2597, The Internet Society*.

Hopps, C., "Analysis of an Equal-Cost Multi-Path Algorithm", *Network Working Group, Request for Comments: 2992, The Internet Society*, (Nov. 2000), 8 pages.

Housley, R., et al., "Using Advanced Encryption Standard (AES) CCM Mode with IPsec Encapsulating Security Payload (ESP)", *Network Working Group; RFC 4309*; Dec. 2005; 13 pages.

Kent, S., et al., "Security Architecture for the Internet Protocol", *Network Working Group; RFC 4301*; Dec. 2005; 101 pages.

Kompella, et al., "Procedures for Modifying the Resource reSerVation Protocol (RSVP)", *Network Working Group, Request for Comments: 3936, The Internet Society*, (Oct. 2004), 8 pages.

Malkin, G., "RIP Version 2", *Network Working Group, Request for Comment: 2453*, Nov. 1998, 39 pages.

Malkin, et al., "RIPng for IPv6", *Network Working Group, Request for Comments: 2080*, (Jan. 1997), 20 pages.

Nichols, K., et al., "Definition of Differentiated Services Per Domain Behaviors and Rules for their Specification", *Network Working Group, Request for Comments: 3086, The Internet Society*, (Apr. 2001), 24 pages.

Nichols, K., et al., "Definition of the Differentiated Services Field (DS Field) in the IPv4 and IPv6 Headers", *Network Working Group, Request for Comments: 2474, The Internet Society*, (Dec. 1998), 20 pages.

Oran, David, "OSI ISIS Intra-domain Routing Protocol", *Network Working Group, Request for Comments: 1142*, Feb. 1990, 206 pages.

Polk, J., et al., "A Resource Reservation Protocol (RSVP) Extension for the Reduction of Bandwidth of a Reservation Flow", *Network Working Group; RFC 4495*; May 2006; 21 pages.

Postel, J., ""User Datagram Protocol",", *STD 6, RFC 768*, Aug. 1980.

Rekhter, Y., et al., "A Border Gateway Protocol 4 (BGP-4)", *Network Working Group, Request for Comments: 4271*, (Jan. 2006), 105 pages.

Rosen, et al., "BGP/MPLS IP Virtual Private Networks (VPNs)", *Network Working Group, Request for Comments: 4364, The Internet Society*, (Feb. 2006), 47 pages.

Shenker, et al., "Specification of Guaranteed Quality of Service", *Network Working Group, Request for Comments: 2212*, (Sep. 1997), 20 pages.

Thaler, et al., "Multipath Issues in Unicast and Multicast Next-Hop Selection", *Network Working Group, Request for Comments: 2991, The Internet Society*, (Nov. 2000), 9 pages.

Wroclawski, J., "Specification of the Controlled-Load Network Element Service", *Network Working Group, Request For Comments: 2211*, (Sep. 1997), 20 pages.

Wroclawski, J., "The Use of RSVP with IETF Integrated Services", *Network Working Group, Request for Comments: 2210*, (Sep. 1997), 33 pages.

Atlas, A., et al., "Basic Specification for IP Fast Reroute; Loop-Free Alternates", *Network Working Group, RFC 5286, Standards Track*, Sep. 2008, 32 pages., 32.

Callon, R., "Use of OSI IS-IS for Routing in TCP/IP and Dual Environments", http://tools.ietf.org/rfc/rfc1195.txt, *Digital Equipment Corp*, Dec. 1990, 80 pages.

Litkowski, S., et al., "Operational management of Loop Free Alternates", *draft-ietf-rtgwg-lfa-manageability-03; Routing Area Working Group*; Expires Aug. 16, 2014; 24 pages.

Moy, J., "RFC 2328—OSPF", *Version 2, Ascend Communications, Inc.*, Apr. 1998, pp. 1-246, http://www.ietf.org/rfc/rfc2328.txt.

\* cited by examiner

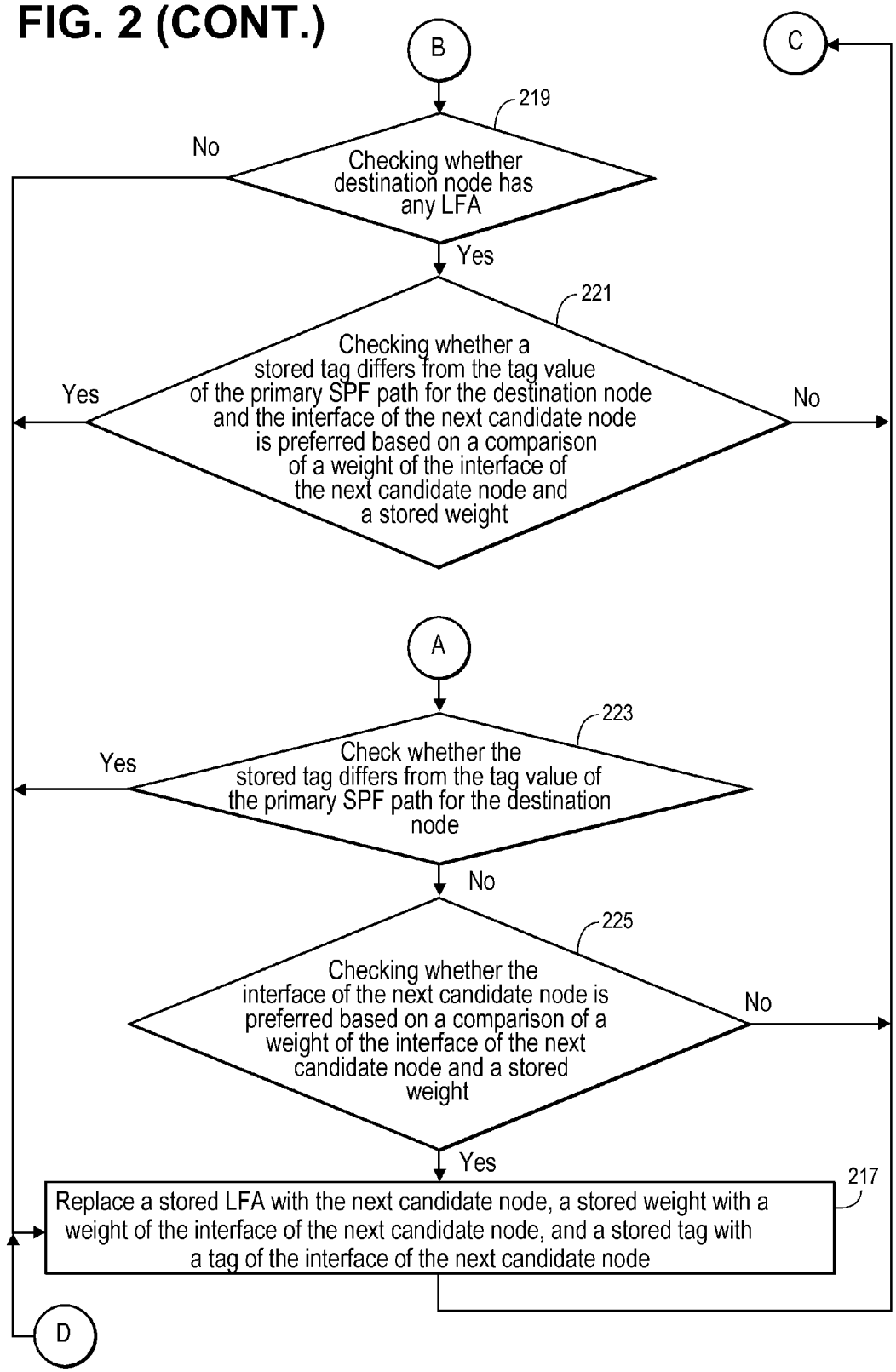

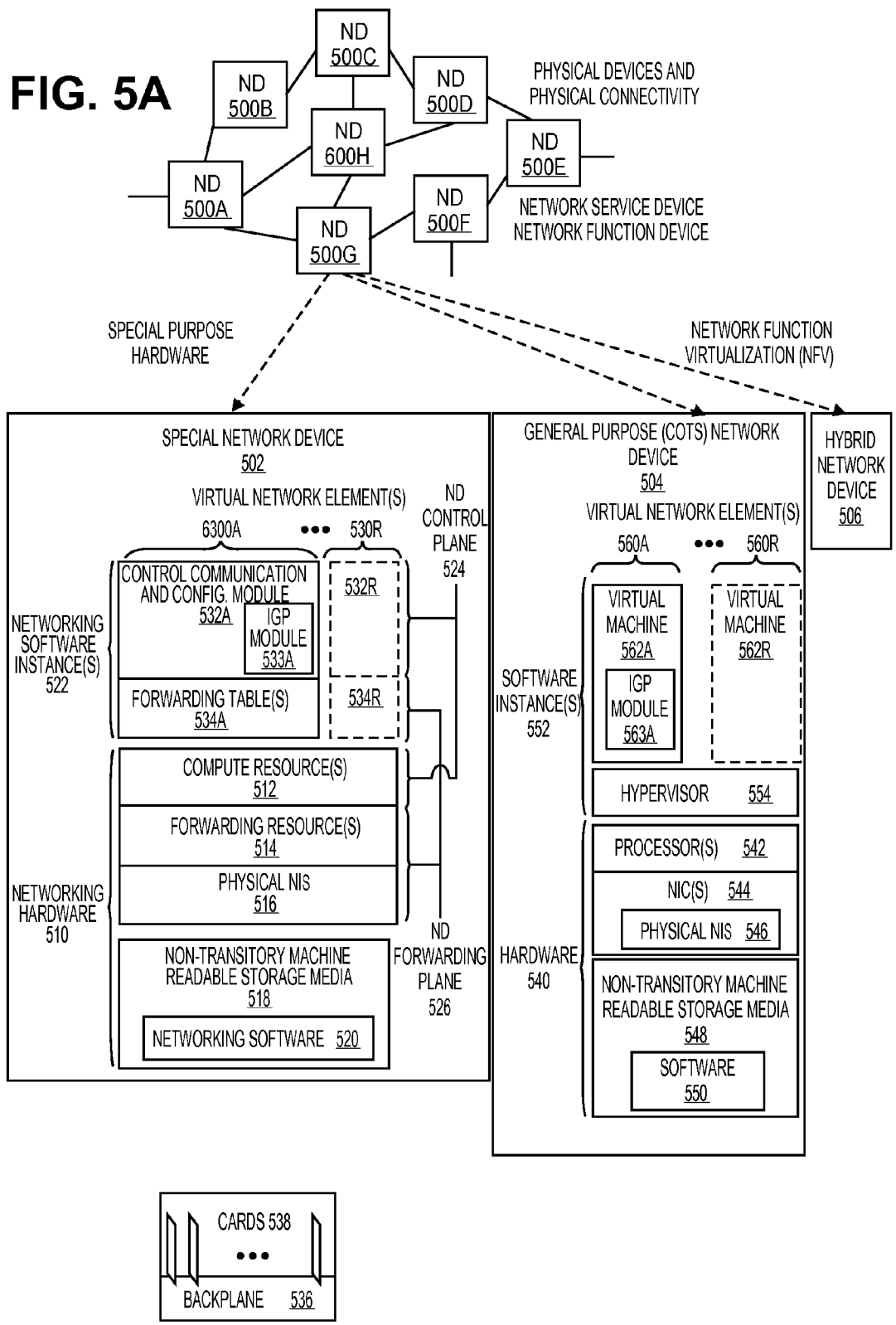

ALTERNATE METHOD TO GIVE OPERATORS FLEXIBILITY TO CHOOSE LFAS

FIELD

Embodiments of the invention relate to the field of interior gateway protocol (IGP) loop free alternative (LFA) computation. More specifically, the embodiments relate to the method and system to enable operators to override the LFA selection process using a local tagging mechanism without having to resort to any IGP protocol enhancements.

BACKGROUND

An Interior Gateway Protocol (IGP) is a type of protocol used for exchanging routing information between gateways (i.e., network devices) within a network including a set of commonly controlled gateways (e.g., a set of corporate local area networks); this network can be referred to as an autonomous system. The exchanged routing information can be used to forward data across the autonomous system using network-level protocols like the Internet Protocol (IP).

Specific examples of IGPs include open shortest path first (OSPF), intermediate system to intermediate system (IS-IS), and routing information protocol (RIP). IGPs are not responsible for routing or exchanging routing information outside of their respective autonomous systems. Exterior or border gateway protocols are used to exchange routing information between autonomous systems and rely on IGPs to resolve routes within an AS.

The IGPs determine a set of paths from each network device in the autonomous system to each other network device in the autonomous system. A primary path is determined at each network device and the next hop to the destination is installed in the forwarding tables of the network device. However, in the case of failure of a next hope device or link a secondary or alternative path is also determined to be utilized in the case of failure until the network device can recalculate a primary path based on the changed topology of the network. RFC 5286 [Basic Specification for IP Fast Reroute: Loop Free Alternatives] lays out a method to compute Loop Free Alternatives (LFA) that is applicable to Interior Gateway Protocols (IGPs) such as the intermediate system-intermediate system (IS-IS) protocol and the open shortest path first (OSPF) protocols. RFC 5286 defines a set of criteria that a next hop must meet to be eligible and selected as a next hop for an LFA path.

The LFA computation of RFC 5286 provides a process for identifying the LFAs that provide the best protection possible for any destination in the autonomous system. Existing provisioning software enables some control of the LFA provisioning options thereby enabling the use of non-best protection LFAs. However, with existing provisioning software the desired alternative path cannot always be selected and some of the provisioning software requires changes to the IGP protocol that may not be feasible in some implementations.

SUMMARY

A method is implemented by a network device in a network having a plurality of nodes. The method computes a loop free alternative (LFA) next hop as a backup for a primary path next hop for an interior gateway protocol (IGP). The method enables an administrator to control LFA selection for a given destination node using a tag and a weight. The method includes selecting a next candidate node from a set of neighbor nodes in the network to perform LFA computation, determining whether an interface of the next candidate node towards a source node, provides an LFA for the destination node, checking whether the interface of the next candidate node has a tag with a tag value matching a tag value of a primary SPF path for the destination node, and checking whether the destination node has any LFA. The method further includes checking whether a stored tag differs from the tag value of the primary SPF path for the destination node, checking whether the interface of the next candidate node is preferred based on a comparison of a weight value of the interface of the next candidate node and a stored weight, and replacing a stored LFA for the destination node with the next candidate node, a stored weight with a weight of the interface of the next candidate node, and a stored tag with a tag of the interface of the next candidate node.

A network device is provided in a network having a plurality of nodes. The network device is configured to compute a loop free alternative (LFA) next hop as a backup for a primary path next hop node for an interior gateway protocol (IGP). The method enables an administrator to control LFA selection for a given destination node using a tag and a weight. The network device includes a non-transitory machine-readable storage medium to store an IGP module and a network processor communicatively coupled to the non-transitory machine-readable storage medium. The network processor executes the IGP module. The IGP module is configured to select a next candidate node from a set of neighbor nodes in the network to perform LFA computation, determine whether an interface of the next candidate node towards a source node, provides an LFA for the destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, and replace a stored LFA for the destination node with the next candidate node, a stored weight with a weight of the interface of the next candidate node, and a stored tag with a tag of the interface of the next candidate node.

A control plane device is configured to implement at least one centralized control plane for a software defined network (SDN). The centralized control plane is configured to execute a method to compute a loop free alternative (LFA) next hop as a backup for a primary path next hop for an interior gateway protocol (IGP). The method enables an administrator to control LFA selection for a given destination node using a tag and a weight. The control plane device includes a non-transitory storage medium to store centralized control plane software and an IGP module and a processor communicatively coupled to the non-transitory storage medium. The IGP module is configured to select a next candidate node from a set of neighbor nodes in the network to perform LFA computation, determine whether an interface of the next candidate node towards a source node, provides an LFA for the destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, and replace a stored LFA for the destination node with the next candidate node, a stored weight with a weight of the interface of the next candidate node, and a stored tag with a tag of the interface of the next candidate node.

A computing device implements a plurality of virtual machines for implementing network function virtualization (NFV), wherein a virtual machine from the plurality of virtual machines is configured to execute a method to compute a loop free alternative (LFA) next hop as a backup for a primary path next hop for an interior gateway protocol (IGP). The method enables an administrator to control LFA selection for a given destination node using a tag and a weight. The computing device includes a non-transitory storage medium to store an IGP module, and a processor communicatively coupled to the non-transitory storage medium. The processor is configured to execute the IGP module. The IGP module is configured select a next candidate node from a set of neighbor nodes in the network to perform LFA computation, determine whether an interface of the next candidate node towards a source node, provides an LFA for the destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, and replace a stored LFA for the destination node with the next candidate node, a stored weight with a weight of the interface of the next candidate node, and a stored tag with a tag of the interface of the next candidate node.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement the special-purpose network device 502 according to some embodiments of the invention.

DESCRIPTION OF EMBODIMENTS

Figure 1A:
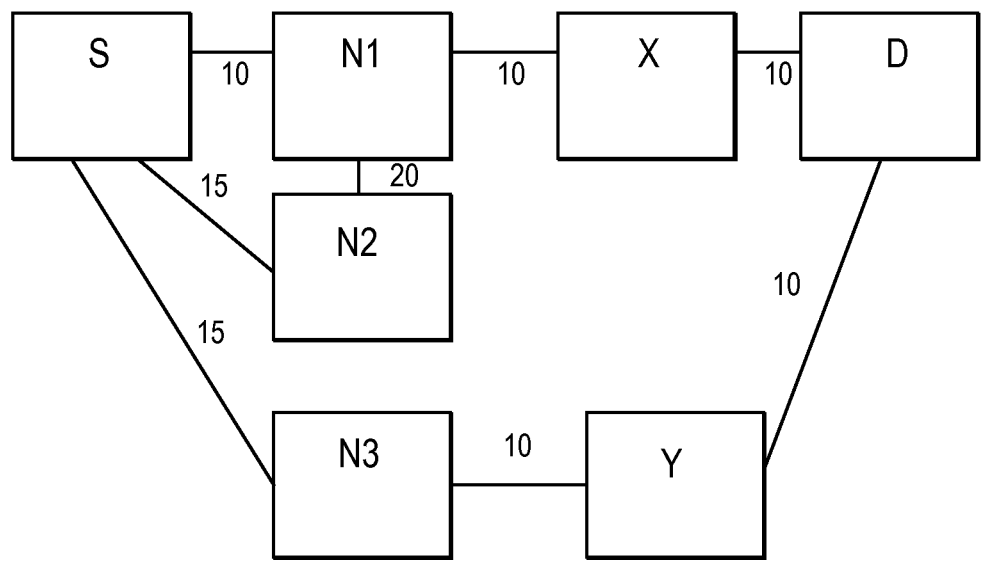
FIG. 1A is a diagram of one embodiment of a network topology where an alternate LFA is desired.

The following description describes methods and apparatus for computation of LFA for an interior gateway protocol (IGP) in an autonomous system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The processes for calculating the LFA for autonomous systems described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1A is a diagram of one embodiment of a network topology where an alternate LFA is desired. In the illustrated network each node is represented with a corresponding name (e.g., source S, intermediate nodes N1 and N2, destination node D) and the link costs are represented above each link connecting two nodes. It should be assumed for this example that all link costs are bi-directional. After a primary SPF computation at node S a set of paths to each other node in the network topology has been determined. In this example, to reach destination node D the next hop of the primary path would be N1 and the total cost of the primary path is 30. Thus, at the source node S the forwarding table would include an entry for destination node D: D→N1 (cost 30), where the '→' indicates that the next hope of the primary path is N1. After SPF is utilized to identify the primary path and its next hop, a loop free alternative (LFA) path and its next hop can be determined. In one embodiment, the LFA is determine per RFC 5286, which defines a set of conditions that the candidate alternative paths must meet to be identified as a valid LFA. One condition is the basic loop free condition, which can be expressed as $(N, D)<(N,S)+(S,D)$, where the parentheticals indicate a function $(x,y)$ that determines a number of hops or distance from node x to node y. Thus, the basic loop free condition is met when the distance from the candidate node N to the destination node D is less than the combined distance from the candidate node to the source and the distance from the source to the destination. This condition ensures that the path from the candidate node is not long enough to have any loops back to the source node. An additional condition can identify whether a candidate node N provides node protection to the primary path. The node protection condition $(N,D)<(N,E)+(E,D)$ (where E is the primary next hop for the destination) is utilized to differentiate LFAs that are only link protecting from those that are also node protecting, with node protection preferred over link only protection.

Applying these conditions to the illustrated topology, it can be seen that neighboring node N2 can only offer link protection (i.e., applying the basic loop free condition yields 40<15+30) to D, however, N2 does not satisfy the node protection equation (i.e., 40<20+20). Whereas neighboring node N3 can offer link protection (20<15+30) to D and node protection (20<25+20); as both conditions are satisfied. Thus, with default LFA configuration options on the link to N1, it is possible destination D will have N3 as the alternative because it provides better protection. For administrative reasons (bandwidth issue on the link towards or node N3's stability issues) an operator may desire to choose node N2 for the LFA. To accomplish this, the operator may need better provisioning mechanism than what is available in the prior art.

Figure 1B:
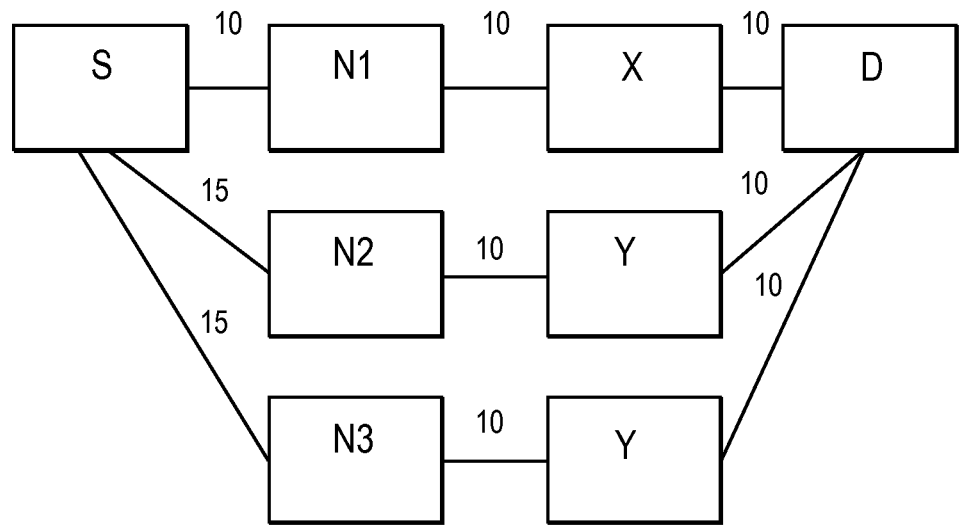
FIG. 1B is a diagram of one embodiment of a network topology where an alternate LFA is desired.

FIG. 1B is a diagram of one embodiment of a network topology where an alternate LFA is desired. Similar to the above example illustrated in FIG. 1A, both node N2 and node N3 in this example topology offer node protection for destination node D as per RFC 5286. In this example topology it is difficult to select a particular next hop as an LFA such as node N2, which may be the more desirable LFA due to administrative reasons, because the existing provisioning options like link-only, node-only, ECMP-only, no-ECMP and related options for provisioning are likely to be ineffective in deterministically selecting node N2. In this example topology, node N2 and N3 meet all of the same criteria and the provisioning options for preferring certain types of nodes over other is ineffective. Thus, the existing provisioning options is ineffective to effect the desired LFA selection and indicates a limitation of the existing provisioning options to only enable selection or preference using discrete categorization of the nodes such as link only or ECMP. The embodiments of the invention provide a method and system for selecting an LFA regardless of the characteristics or categorization of the LFA nodes.

Figure 2:
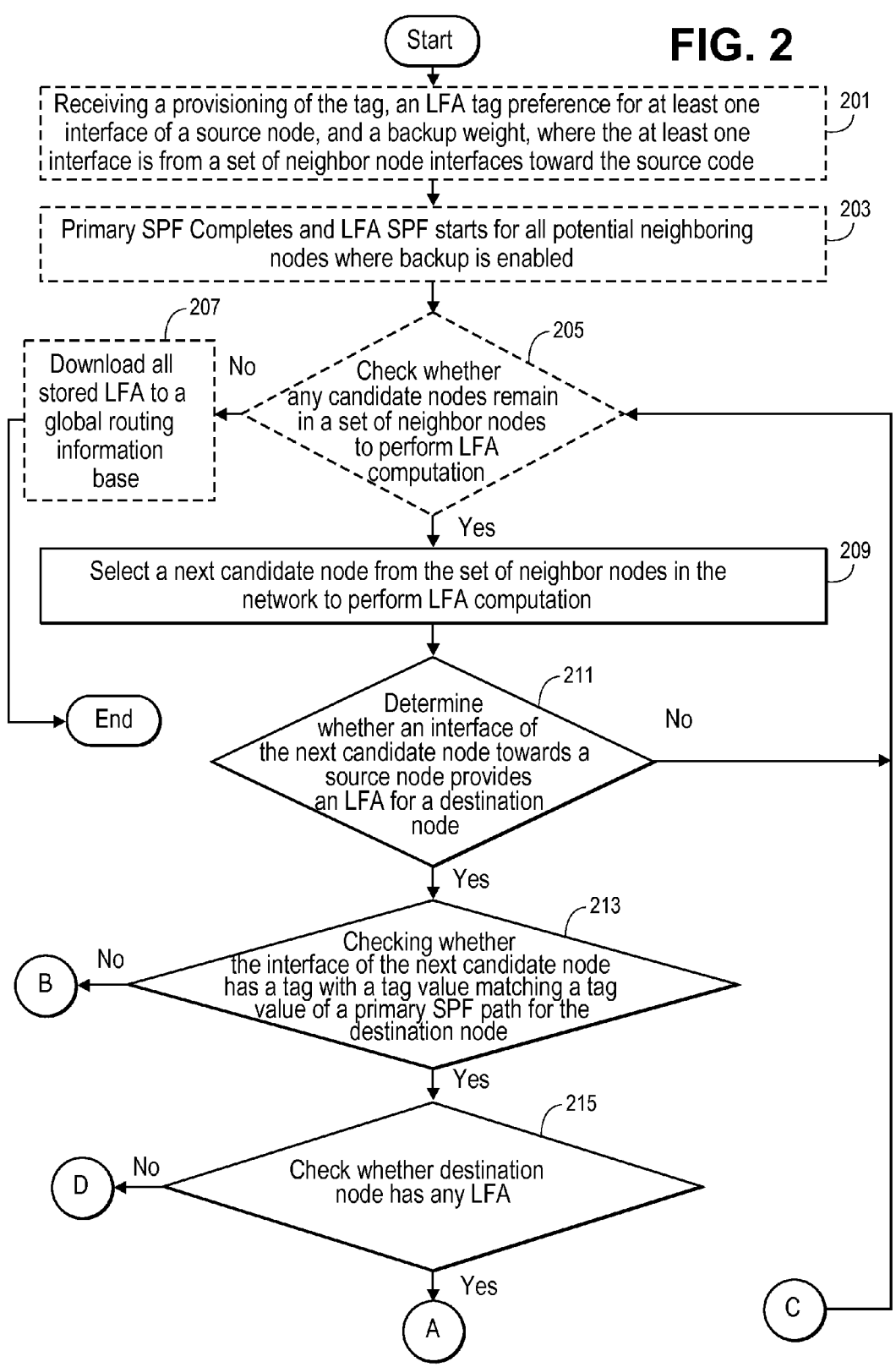
FIG. 2 is a flowchart of one embodiment of a LFA computation process for routes in an autonomous system that accounts for operator tagging.

FIG. 2 is a flowchart of one embodiment of a LFA computation process for routes in an autonomous system that accounts for operator tagging. LFA computation is part of an overall process for building a forwarding table for the handling of data traffic within an autonomous system, network domain or similar network. The IGP process first exchange link state information that enables all of the nodes within the network to determine the topology of the network. Using this topology a set of paths from each node to every other node are determined and the optimal next hops of these paths is recorded in the forwarding tables of the respective network nodes, which are each network devices. The paths and their next hops are the primary paths to their respective destinations. With the primary destinations determined, the process then determines alternative paths, in this case LFAs to be utilized in case of failure along the primary path. Whenever LFA computation is done i.e., while forming the Shortest Path Tree (SPT), rooted at each neighbor of a source node, for each destination encountered, a check of the inequalities is made as specified in RFC 5286 (per operator policy and as applicable from inequality 1 to 4).

The embodiments provide a simple provisioning override with a local tagging mechanism for the operator; with which the desired alternative LFA can be selected regardless of the network topology, including topologies such as those described herein above. The embodiments do not require any IGP (e.g., OSPF or IS-IS) protocol changes, in contrast to other existing provisioning processes. The tagging process and handling is local to the network device. The process and system provide complete control of selecting alternative LFA nodes at local level by overriding the default best protection possible selection process as provided in RFC 5286.

In one example embodiment, on the IGP (e.g., OSPF or IS-IS) routing instance i.e., on the interface/address-family level the following commands or similar command may be implemented: (1) [no] lfa-tag-preference<tag value 1-255>; (2) [no] tag <tag value 1-255>; and (3) [no] lfa-backup weight<1-255>(default 10). These functions (1) create a preference for a particular tag value an LFA can have, (2) set a tag value and (3) set an LFA backup weight, respectively. As discussed further herein below, these functions can be utilized at the network device to create preferences for particular interfaces (i.e., links to neighboring nodes). One skilled in the art would understand that other provisioning mechanisms can be used to tag interfaces and to associate them with backup tags and backup weights. The above example embodiment is provided by way of example and not limitation.

With this set of commands on every LFA enabled interface where control is needed or desired a tag VALUE in the range of 1-255 can be provisioned (e.g., tag xxx). On the other interfaces where a potential backup can be possible an lfa-tag-preference can be provisioned with the appropriate weight (lfa-tag-preference xxx weight yyy). Also all backup eligible links can be provisioned with a default weight and can be allowed to configure an alternate "weight" in the provided range.

During computation, if the primary interface for any destination has a "tag" configured then the backup will be preferred if it has matching tag value (this is after basic loop free condition and node protection condition as applicable), in the case where multiple alternatives are possible with matching tags, then the alternative with higher weight will be preferred regardless of the protection it can offer. For example, a primary interface can be provisioned with "tag 100" and an option for node protection (LFA configuration) can be set. If the first eligible alternative does satisfy the node protection condition but doesn't have any matching tag preference "lfa-tag-preference 100" then this will be considered as potential candidate alternative with the weight as provisioned. However, if the next alternative has a matching tag value and satisfies any protection (link or node) this would be considered as potential (preferred) alternative.

In this manner, an operator can exercise his control on selecting the alternatives and sometimes those nodes that are selected might not provide best protection, but can meet the requirements as conceived by the operator.

The operation of the process is further describe with relation to the flowchart, where the process begins with the network device receiving a provisioning of at least one tag, an LFA tag preference for at least one interface of a set of neighbor node interfaces toward a source node (i.e. the node performing the computation) and a weight value (Block 201). The process can be implemented by an IGP module at the network device. The interface for the operator to input the provisioning commands can be local to the network device or remote from the network device using any type of provisioning software including command line interfaces (CLI), graphical user interfaces or similar interfaces. The provisioning software utilized by the operator to input the provisioning is referred to herein as the administrative module, which can be executed at the network device or remotely as discussed further herein below. The operator can provision tags, weights and LFA preferences for any number of interfaces. As discussed above, the specific commands to provision can have any format or syntax and are not limited to the examples discussed herein.

Once the provisioning has been established in the network device, the primary SPF process executes and completes and the LFA SPF process starts for all potential neighboring nodes where backup is enabled (Block 203). The provisioning and SPF steps are optional in that they do not necessarily immediately precede the application of the tagging to an LFA process and play the role of configuring the environment in which the LFA computation operates. The process checks whether any of the candidate nodes (from the set of neighbor nodes) remain to be processed in the LFA computation (Block 205). The process iterates through each of the candidate neighboring nodes keeping a best candidate as a 'stored LFA' on each iteration until all have been processed and one interface selected as an LFA if an eligible candidate is found. The 'stored LFA' is tracked along with a 'stored tag' and 'stored weight,' as discussed further herein below. The process completes and the set of stored LFAs are downloaded to the global routing information base after all of the candidate nodes have been processed (Block 207).

The process selects a next candidate node from the set of neighbor nodes in the network (Block 209). The selected node is utilized to perform the LFA computation; for each shortest path destination node generated by the LFA computation. This process generally follows the process of RFC 5286 with the differences noted herein. The process checks to determine whether the interface of the selected candidate node towards a source node, provides an LFA for a destination node (Block 211). In other words, does the interface of the selected candidate node meet the basic loop free condition and/or similar conditions for qualifying as an LFA for a given destination node. If the interface of the candidate does not qualify as an LFA, then the process continues for all destination nodes and eventually to check whether additional candidates remain and to select a next candidate for processing (Blocks 205 and 209).

If the interface of the candidate node does qualify as an LFA, then the process continues by checking whether the interface of the candidate node has a tag with a tag value matching a tag value of a primary SPF path for the destination node (Block 213). This indicates that the operator has provided a preference for this node for the given destination. If the selected candidate does not have a matching tag value, then the process checks whether the destination node has any LFA (Block 219). If there is not any LFA for the destination node, then the process replaces the stored LFA with the candidate node, stores the weight of the interface of the candidate node as a stored weight and stores the tag of the interface of the candidate node as the stored tag (Block 217), before continuing on to select and consider the next destination node through current LFA computation and eventually the next candidate node (Blocks 205 and 209).

If there is an LFA for the destination node, then a check is made whether a stored tag differs from the tag value of the primary SPF path for the destination node and the interface of the next candidate node is preferred based on a comparison of a weight of the interface of the next candidate node and a stored weight (Block 221). Where the tags differ but there is a preferred weight, then the process replaces the stored LFA with the candidate node, stores the weight of the interface of the candidate node as a stored weight and stores the tag of the interface of the candidate node as the stored tag (Block 217), before continuing on to select and consider the next destination node through current LFA computation and eventually the next candidate node (Blocks 205 and 209). If this is not the case then, the process continues on to select and consider the next candidate node (Blocks 205 and 209).

If the tags do match (Block 213), then a check is made whether there is any LFA for the destination node (Block 215). If there is not an LFA, then the process replaces the stored LFA with the candidate node, stores the weight of the interface of the candidate node as a stored weight and stores the tag of the interface of the candidate node as the stored tag (Block 217), before continuing on to select and consider the next destination node through current LFA computation and eventually the next candidate node (Blocks 205 and 209).

If there is an LFA (Block 215), then a check is made whether a stored tag differs from the tag value of the primary SPF path for the destination node (Block 223). If the tag differs, then the process replaces the stored LFA with the candidate node, stores the weight of the interface of the candidate node as a stored weight and stores the tag of the interface of the candidate node as the stored tag (Block 217), before continuing on to select and consider the next destination node through current LFA computation and eventually the next candidate node (Blocks 205 and 209).

If the tag does not differ (Block 223), then a check is made whether the interface of the candidate node has a weight value that will make it preferred over a weight value of a stored LFA, (i.e., a stored weigh value found in a prior iteration or a default) for the current destination. (Block 225). If the weight does not make the selected candidate node preferred, then the process continues by checking for additional unprocessed candidate nodes (Block 205 and 209). A weight can be 'preferred' when it is higher or lower than another weight depending on the weighting system, typically a higher or larger weight value is preferred over a lower or smaller weight value.

If the selected candidate node does have a weight that makes it preferred over the current candidate node, then the process replaces the stored LFA with the candidate node, stores the weight of the interface of the candidate node as a stored weight and stores the tag of the interface of the candidate node as the stored tag (Block 217), before continuing on to select and consider the next destination node through current LFA computation and eventually the next candidate node (Blocks 205 and 209). Thus, the node that is selected as the stored LFA at the time that all of the candidate nodes have been processed is the LFA node that is installed in the global routing information base and utilized by the network device in case of link or node failure of the primary path (Block 207).

Figure 3:
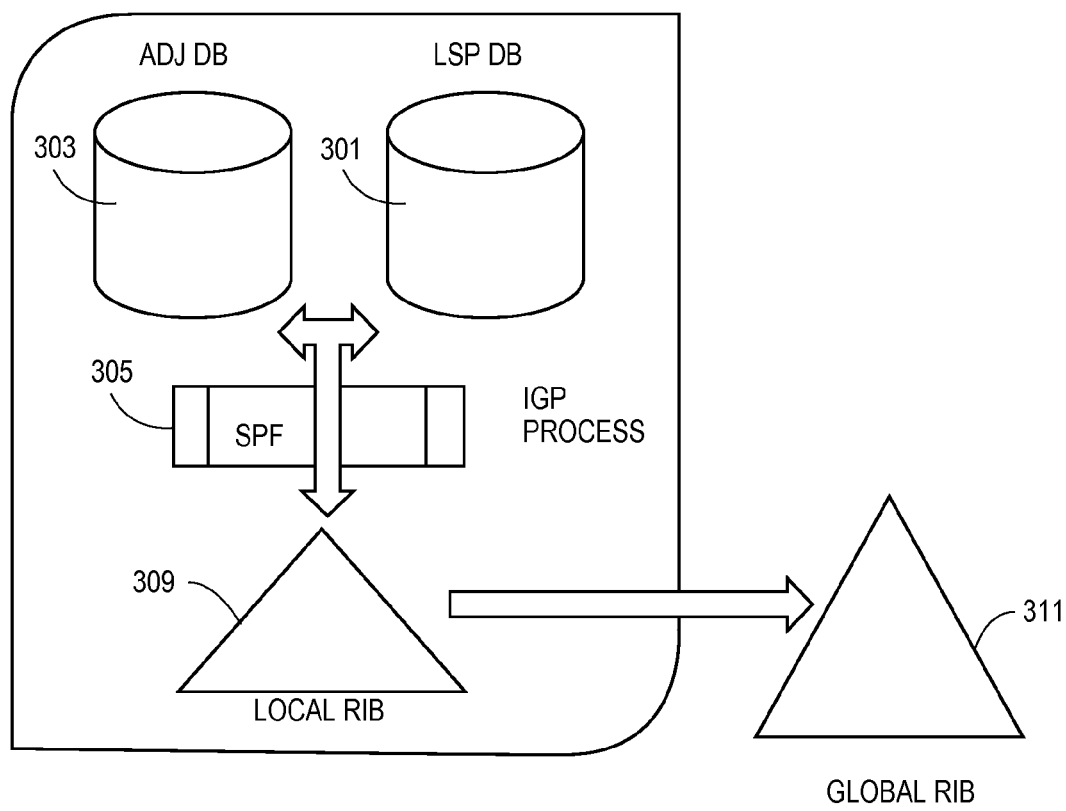
FIG. 3 is a diagram of the basic components of the IGP process.

FIG. 3 is a diagram of the basic components of the IGP process. The components of the network device that are utilized in the IGP process include an adjacency (ADJ) database 303, a link state protocol (LSP) database 301, a shortest path first (SPF) 305 or similar routing process, and a local RIB 309. The adjacency database 303 tracks adjacency information received from neighboring nodes connected through the physical ports and links of the network device. The link state protocol database 301 tracks the topology of the network or autonomous system in which the network device is situated, which is based on exchange of link state packets. A shortest path first 305 or similar route computation algorithm processes the link state protocol database 301 to determine forwarding information that is stored in the local routing information base 309. In some embodiments, the local routing information base is synchronized or downloaded to a global routing information base 311 that is shared by all components of the network device such as line cards and similar components or that may be shared with other network devices in the network or autonomous system.

Figure 4:
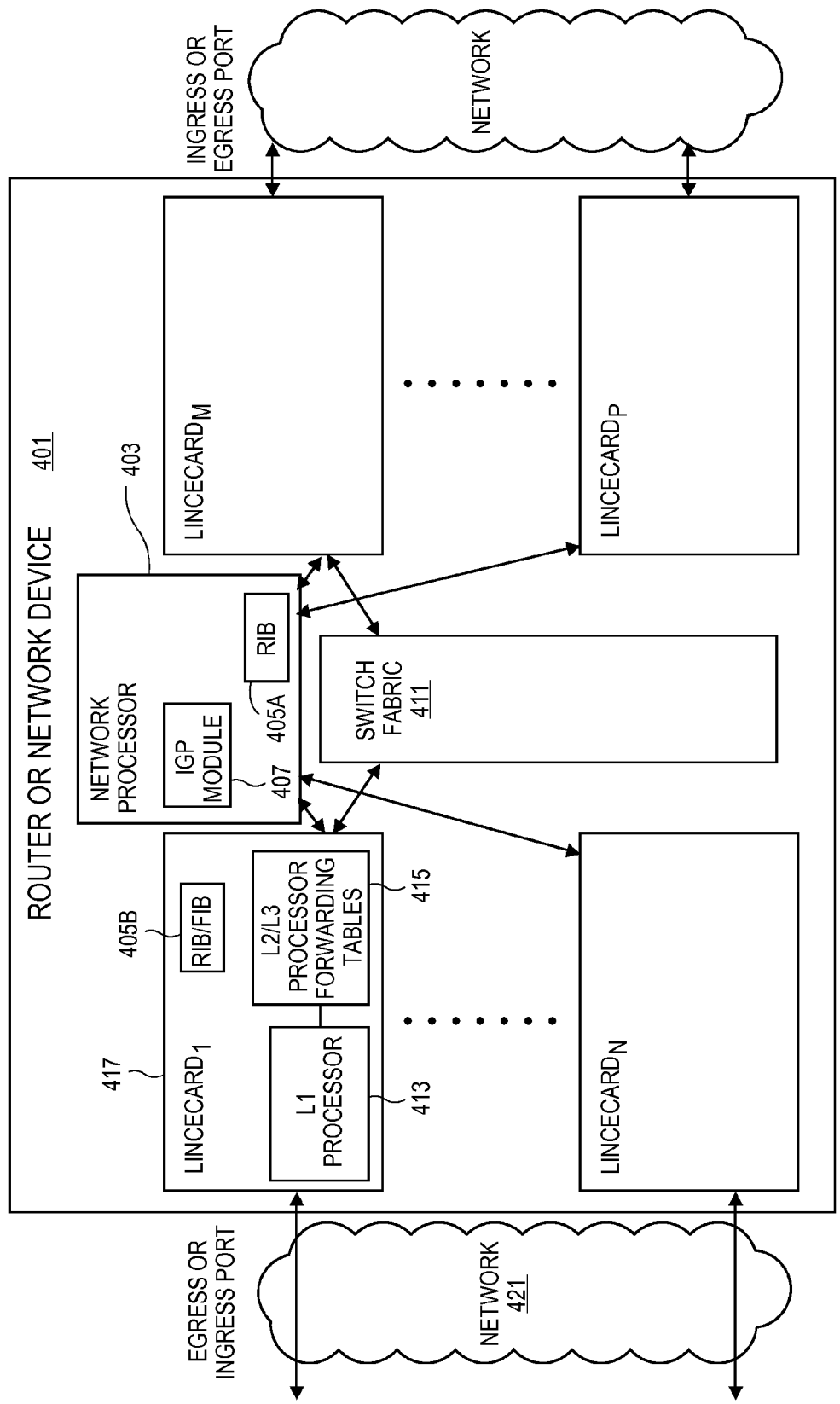
FIG. 4 is a diagram of one embodiment of a network device implementing the LFA computation process.

FIG. 4 is a diagram of one embodiment of a network device implementing the LFA computation process in an autonomous system.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 401 or network device or similar computing device. The router 401 can have any structure that enables it to receive data traffic and forward it toward its destination. The router 401 can include a network processor 403 or set of network processors that execute the functions of the router 401. A 'set,' as used herein, is any positive whole number of items including one item. The router 401 or network element can execute IGP and LFA computation functionality via a network processor 403 or other components of the router 401.

The IGP and LFA functions can be implemented as modules in any combination of software, including firmware, and hardware within the router. The functions of the IGP process that are executed and implemented by the router 401 include those described further herein above.

In one embodiment, the router 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the IGP and LFA process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the IGP and LFA process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). The IPG module 533A implements the processes described herein above including LFA computation as part of the Control communication and Configuration Module 532A or similar aspect of the networking software, which may be loaded and stored in the non-transitory machine readable media 518A or in a similar location.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R. In one embodiment, the virtual machines 532A-R may execute the described IGP module 563A and related software described herein above.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 5C:
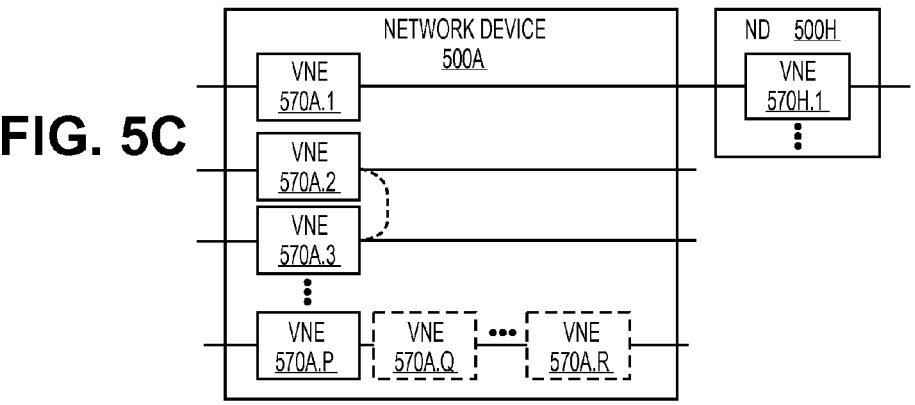
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 580A.Q-580A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multi-protocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
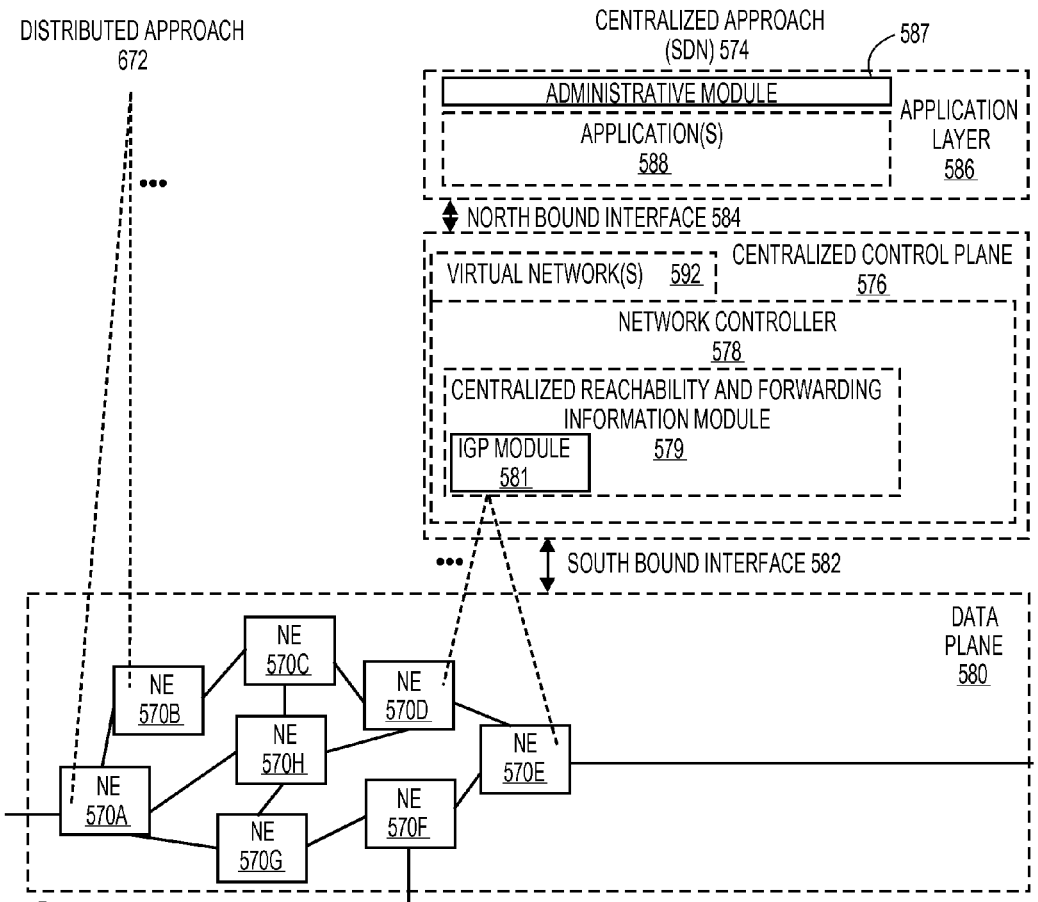
FIG. 5D illustrates a network with a single network element (NE) on each of the NDs of FIG. 5A, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 172 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576

(sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the IGP module 581 and related software as described herein above. In one embodiment, the administrative module 587 providing an interface for the operator to configure tags and LFA preferences can be implemented at the application layer 586.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 174 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 684 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figures 5E, 5F:
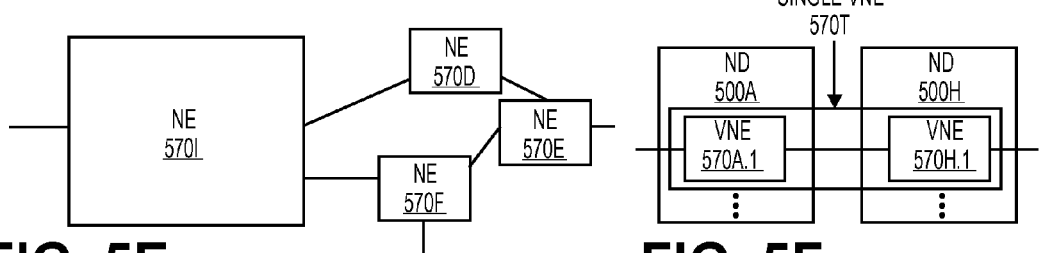
FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention.
FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
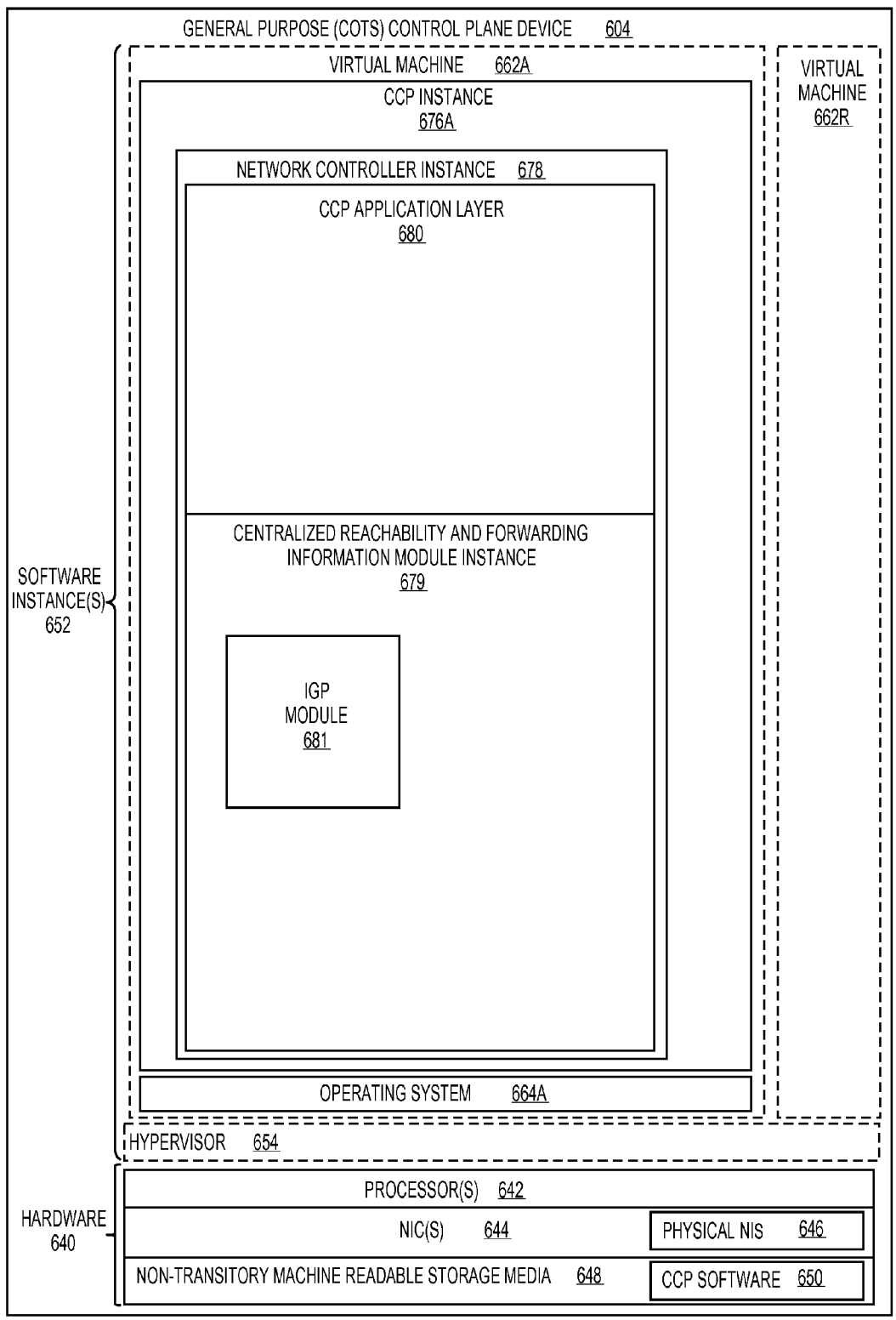
FIG. 6 illustrates a general purpose control plane device 604 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 704.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 678 to the operating system 664A and communicating with the various NEs), and an CCP application layer 680 (sometimes referred to as an application layer) over the middleware layer (providing the intelligence required for various network operations such as protocols, network situational awareness, and user-interfaces). In one embodiment, the centralized reachability and forwarding information module 679 may include the IGP module 681 and related software as described herein above.

At a more abstract level, this CCP application layer 680 within the centralized control plane 676 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a network having a plurality of nodes, the method to compute a loop free alternative (LFA) next hop as a backup for a primary path next hop for an interior gateway protocol (IGP), where the method enables an administrator to control LFA selection for a destination node using a tag and a weight, the method comprising the steps of:
    selecting a next candidate node from a set of neighbor nodes in the network to perform LFA computation;
    determining whether an interface of the next candidate node towards a source node provides an LFA for the destination node;
    checking whether the interface of the next candidate node has a tag with a tag value matching a tag value of a primary SPF path for the destination node;
    checking whether the destination node has any LFA;
    checking whether a stored tag differs from the tag value of the primary SPF path for the destination node;
    checking whether the interface of the next candidate node is preferred based on a comparison of a weight value of the interface of the next candidate node and a stored weight;
    replacing a stored LFA for the destination node with the next candidate node, a stored weight with a weight of the interface of the next candidate node, and a stored tag with a tag of the interface of the next candidate node; and
    downloading the stored LFA to a global routing information base after all candidate nodes have been exhausted.

2. The method of claim 1, further comprising the step of:
    receiving a provisioning of the tag, an LFA tag preference for at least one interface of a source node, and a backup weight value, where the at least one interface is from a set of neighbor node interfaces toward the source node.

3. The method of claim 1, further comprising the step of:
    checking whether all candidate nodes from the set of neighbor nodes have been processed for LFA computation.

4. The method of claim 1, wherein the IGP is for internet protocol (IP) version 4.

5. The method of claim 1, wherein the IGP is for internet protocol (IP) version 6.

6. The method of claim 1, wherein the IGP is intermediate system to intermediate system (IS-IS).

7. The method of claim 1, wherein the IGP is open shortest path first (OSPF).

8. A network device in a network having a plurality of nodes, the network device configured to compute a loop free alternative (LFA) next hop as a backup for a primary path next hop node for an interior gateway protocol (IGP), where the method enables an administrator to control LFA selection for a given destination node using a tag and a weight, the network device comprising:
    a non-transitory machine-readable storage medium to store an IGP module; and
    a network processor communicatively coupled to the non-transitory machine-readable storage medium, the network processor to execute the IGP module, the IGP module configured to select a next candidate node from a set of neighbor nodes in the network to perform LFA computation, determine whether an interface of the next candidate node towards a source node, provides an LFA for the destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, replace a stored LFA for the destination node with the next candidate node, a stored weight with a weight of the interface of the next candidate node, and a stored tag with a tag of the interface of the next candidate node; and download the stored LFA to a global routing information base after all candidate nodes have been exhausted.

9. The network device of claim 8, wherein the network processor is configured to execute the IGP module which is further configured to receive a provisioning of the tag, an LFA tag preference for at least one interface of a source node, and a backup weight value, where the at least one interface is from a set of neighbor node interfaces toward the source node.

10. The network device of claim 8, wherein the network processor is configured to execute the IGP module which is further configured to check whether all candidate nodes from the set of neighbor nodes have been processed for LFA computation.

11. The network device of claim 8, wherein the IGP is for internet protocol (IP) version 4.

12. The network device of claim 8, wherein the IGP is for internet protocol (IP) version 6.

13. The network device of claim 8, wherein the IGP is intermediate system to intermediate system (IS-IS).

14. The network device of claim 8, wherein the IGP is open shortest path first (OSPF).

15. A control plane device configured to implement at least one centralized control plane for a software defined network (SDN), the centralized control plane configured to execute a method to compute a loop free alternative (LFA) next hop as a backup for a primary path next hop for an interior gateway protocol (IGP), where the method enables an administrator to control LFA selection for a given destination node using a tag and a weight, the control plane device comprising:

a non-transitory storage medium to store centralized control plane software and an IGP module; and a processor communicatively coupled to the non-transitory storage medium, the processor configured to execute the control plane software to implement the IGP module, the IGP module configured to select a next candidate node from a set of neighbor nodes in the network to perform LFA computation, determine whether an interface of the next candidate node towards a source node, provides an LFA for the given destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, replace a stored LFA for the destination node with the next candidate node, a stored weight with a weight of the interface of the next candidate node, and a stored tag with a tag of the interface of the next candidate node, and download the stored LFA to a global routing information base after all candidate nodes have been exhausted.

16. The control plane device of claim 15, wherein the network processor is configured to execute the IGP module which is further configured to receive a provisioning of the tag, an LFA tag preference for at least one interface of a source node, and a backup weight value, where the at least one interface is from a set of neighbor node interfaces toward the source node.

17. The control plane device of claim 15, wherein the network processor is configured to execute the IGP module which is further configured to check whether all candidate nodes from the set of neighbor nodes have been processed for LFA computation.

18. A computing device implementing a plurality of virtual machines for implementing network function virtualization (NFV), wherein a virtual machine from the plurality of virtual machines is configured to execute a method to compute a loop free alternative (LFA) next hop as a backup for a primary path next hop for an interior gateway protocol (IGP), where the method enables an administrator to control LFA selection for a given destination node using a tag and a weight, the computing device comprising:

a non-transitory storage medium to store an IGP module; and a processor communicatively coupled to the non-transitory storage medium, the processor configured to execute the IGP module, the IGP module configured to select a next candidate node from a set of neighbor nodes in the network to perform LFA computation, determine whether an interface of the next candidate node towards a source node, provides an LFA for the destination node, check whether the interface of the next candidate node has a tag with a tag value matching a tag value of a primary SPF path for the destination node, check whether the destination node has any LFA, check whether a stored tag differs from the tag value of the primary SPF path for the destination node, check whether the interface of the next candidate node is preferred based on a comparison of a weight value of the interface of the next candidate node and a stored weight, replace a stored LFA for the destination node with the next candidate node, a stored weight with a weight of the interface of the next candidate node, and a stored tag with a tag of the interface of the next candidate node, and download the stored LFA to a global routing information base after all candidate nodes have been exhausted.

19. The computing device of claim 18, wherein the network processor is configured to execute the IGP module which is further configured to receive a provisioning of the tag, an LFA tag preference for at least one interface of a source node, and a backup weight value, where the at least one interface is from a set of neighbor node interfaces toward the source node.

20. The computing device of claim 18, wherein the network processor is configured to execute the IGP module which is further configured to check whether all candidate nodes from the set of neighbor nodes have been processed for LFA computation.

* * * * *